(12) United States Patent
Crist et al.

(10) Patent No.: US 6,928,958 B2
(45) Date of Patent: Aug. 16, 2005

(54) VIBRATION SENSOR ASSEMBLY AND METHOD FOR BARK CONTROLLER

(75) Inventors: Timothy J. Crist, Tucson, AZ (US);
Timothy T. Duncan, Tucson, AZ (US);
Francisco J. Napolez, Tucson, AZ (US)

(73) Assignee: Tri-Tronics, Inc., Tucson, AZ (US)

( * ) Notice: Subject to any disclaimer, the term of this patent is extended or adjusted under 35 U.S.C. 154(b) by 0 days.

(21) Appl. No.: 10/753,008

(22) Filed: Jan. 7, 2004

(65) Prior Publication Data

US 2005/0145198 A1    Jul. 7, 2005

(51) Int. Cl.$^7$ ............................................ A01K 15/00
(52) U.S. Cl. ...................... 119/718; 119/719; 119/908; 340/573.3
(58) Field of Search ........................ 119/712, 718, 719, 119/720, 721, 908, 905; 340/573.1, 573.2, 340/573.3

(56) References Cited

U.S. PATENT DOCUMENTS

| | | | | |
|---|---|---|---|---|
| 4,947,795 A | | 8/1990 | Farkas ........................... | 119/29 |
| 5,061,918 A | * | 10/1991 | Hunter ...................... | 340/573.2 |
| 5,601,054 A | * | 2/1997 | So ............................... | 119/718 |
| 5,815,077 A | * | 9/1998 | Christiansen ............. | 340/573.3 |
| 5,913,284 A | * | 6/1999 | Van Curen et al. .......... | 119/720 |
| 5,927,233 A | * | 7/1999 | Mainini et al. .............. | 119/718 |
| 6,073,589 A | * | 6/2000 | Curen et al. ................. | 119/720 |
| 6,431,121 B1 | * | 8/2002 | Mainini et al. .............. | 119/718 |
| 6,668,760 B2 | * | 12/2003 | Groh et al. .................. | 119/718 |
| 6,761,131 B2 | * | 7/2004 | Suzuki ......................... | 119/174 |

\* cited by examiner

*Primary Examiner*—Yvonne R. Abbott
(74) *Attorney, Agent, or Firm*—Cahill, von Hellens & Glazer P.L.C.

(57) ABSTRACT

A dog bark limiter includes a housing (2) supported against the dog's skin by a strap, stimulus electrodes (5), and a sensor (6) for producing signals in response to vocalizing by the dog. The sensor includes a membrane (6) supported by the surface (9) for efficiently transmitting sound energy through the housing and a rigid nipple (11) engaging the membrane. Control circuitry in the housing has an input coupled to an output of the transducer and output terminals coupled to produce aversive stimulus signals between the first and second electrodes in response to the signals produced in response valid barking by the dog. A motion detector (40) produces a motion detection signal in response to a characteristic movement of the portion of dog that accompanies barking by the dog and aids in detecting a valid bark. A controller (33) executes a frequency capture routine to produce a frequency spectrum of the dog's vocalizations and compares it with a valid bark spectrum to determine if the vocalization constitutes a valid bark.

19 Claims, 9 Drawing Sheets

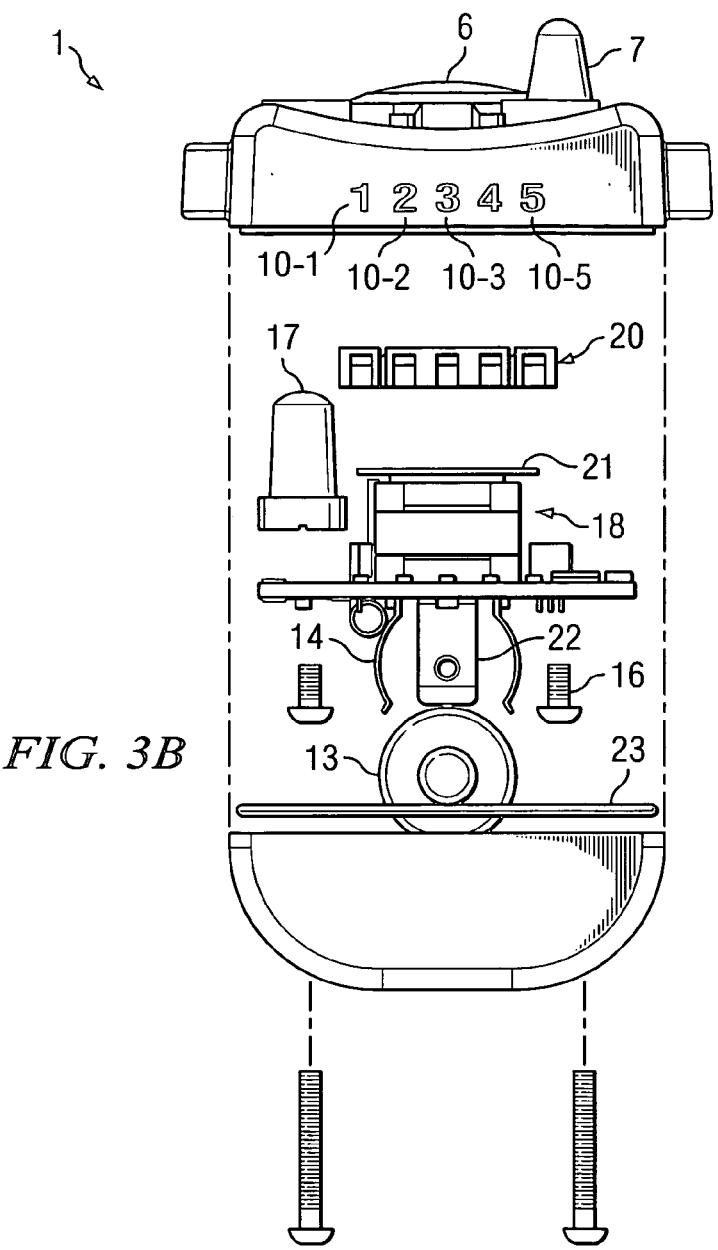
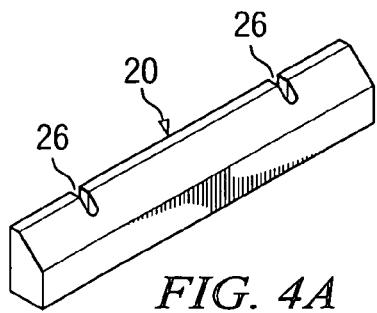
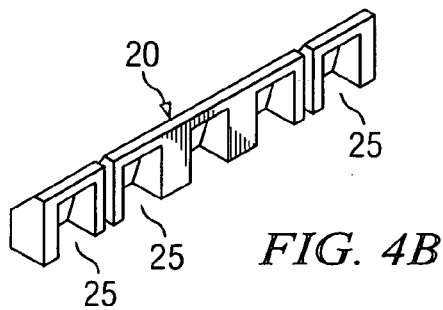
FIG. 3B
FIG. 4A
FIG. 4B

VIBRATION SENSOR ASSEMBLY AND METHOD FOR BARK CONTROLLER

BACKGROUND OF THE INVENTION

The present invention relates generally to collar-mounted electronic "bark limiter" or dog bark training devices, and more particularly to improvements therein which allow improved, more reliable sensing of vibration due to barking of the dog. The invention also relates to improved determination of what constitutes valid barking.

A variety of electronic dog training collars have been utilized for applying electrical shock and/or audible stimulus to a dog when it barks. In many situations it is highly desirable to prevent individual dogs or groups of dogs from barking excessively. For example, one dog's barking in a kennel is likely to stimulate other dogs to bark. This is undesirable with respect to the welfare of the dogs themselves and nearby people. Similar problems occur in neighborhoods in which there are dogs that are kept outside at night: if one dog starts barking others are likely to join in, causing a general disturbance.

The closest prior art is believed to include the present assignee's Bark Limiter product and commonly assigned U.S. Pat. No. 4,947,795 by G. Farkas entitled "Barking Control Device and Method", issued Aug. 14, 1990 and incorporated herein by reference.

The Tri-Tronics collar-mounted Bark Limiter product has been successfully marketed by the present assignee for many years. It has been very successful in the market because it effectively controls unwanted barking of large and medium-sized dogs. Its large size has allowed use of large batteries to power the circuitry that allows the Bark Limiter product to produce a substantial level of stimulation, which has been a major reason for the product's success. However, the large size and weight of the assignee's Bark Limiter product have limited it to use on medium-sized and large-sized dogs. Competitive products that have been smaller in size and weight and therefore have been usable on a small or tiny dogs have been introduced to the market, but their small size evidently has necessitated a substantial reduction in the level of stimulation that such products can produce in response to the dog's barking.

Above mentioned U.S. Pat. No. 4,947,795 discloses a bark training device which allows a dog to control the level of electrical stimulus in response to its own barking behavior. This patent discloses circuitry in a collar-mounted electrical device that detects the onset of barking and initially produces only a single low level electrical stimulus pulse that gets the dog's attention, but does not initially produce a highly unpleasant level of stimulation. If the dog continues barking, the stimulation levels of the electrical shock pulses are increased at the onset of each barking episode in a stepwise fashion until the stimulus becomes so unpleasant that the dog stops barking for at least a predetermined time, e.g., one minute. After that minute elapses, the circuitry resets itself to its lowest initial stimultion level and remains inactive until barking begins again, and then repeats the process, beginning with the lowest level of stimulation and increasing the stimulus level if barking continues.

Users of collar-mounted bark training products generally wish to be able to test such products by demonstrating their operability in response to a suitable sound or simulated bark signal. The assignee's prior Bark Limiter product has utilized test lights and an external tester that actuates a barking sound vibration sensor of the Bark Limiter. Some of the prior art bark limiters have vibration sensors such as electret condenser microphones built into their housings between the stimulus electrodes. External buzzers have been used to stimulate the vibration sensor in order to test it and determine if the bark limiter is operative.

A shortcoming of the prior art bark training products is that they detect nearly any sound the dog makes and automatically shock the dog in response to the detected sound. The battery life of some prior bark limiters has been undesirably short because dog owners often find it convenient to leave the devices in a "power on" condition for long periods of time, even during times when the dog is not likely to be barking.

There is an unmet need for an improved sound vibration sensing device for an animal control device mounted on an animal.

There is an unmet need for a bark control device that discriminates between various sounds and vibrations that a dog might make and avoids applying electrical stimulus to the dog in response to any sound other than a valid bark sound.

There also is an unmet need for a small, lightweight, highly effective bark control device that is small and light enough to be readily worn by a small or tiny dog.

There also is an unmet need for an improved bark control device that provides a convenient and effective self-test capability.

There also is an unmet need for an improved bark control device that avoids problems caused by the reliability of prior external vibration sensors and breakage of wire connections thereto.

SUMMARY OF THE INVENTION

It is an object of the invention to provide an improved sound or vibration sensing device for an animal control device mounted on an animal.

It is another object of the invention to provide a bark control device that discriminates between various sounds and vibrations that a dog might make and avoids applying electrical stimulus to the dog in response to any sound other than a valid bark sound.

It is another object of the invention to provide a small, lightweight, highly effective bark control device that is small and light enough to be readily worn by a small or tiny dog.

It is another object of the invention to provide an improved bark control device that provides a convenient and effective self-test capability.

It is another object of the invention to provide an improved bark control device that cannot be accidentally or deliberately turned off by a dog's scratching activity and that provides a convenient and effective self-test capability.

Briefly described, and in accordance with one embodiment, the present invention provides an electronic apparatus (1) for control of vocalizing by a dog, including a housing (2) supported against the animal's skin by a strap, first and second stimulus electrodes (5) connected to a surface (9) of the housing, and a sensor (6) supported by the housing for producing signals in response to vocalizing by the dog, wherein the sensor includes a membrane (6) supported by the surface (9) for transmitting vibration energy from the vocalizing of the dog through the housing and a rigid nipple (11) engaging a center point of the membrane. The sound transducer (21) engages the nipple. Control circuitry in the housing has an input coupled to an output of the transducer and output terminals coupled to produce aversive stimulus signals between the first and second electrodes in response to the signals produced in response to vocalizing by the dog.

In a described embodiment, the control circuitry includes a controller (33) which executes a stored program for selecting a range of frequencies within which valid vocalizing sounds fall and dividing the range into a plurality of sub-ranges and storing the sub-ranges. Sounds vocalized by the dog are electronically converted into a sequence of corresponding signals representing the frequencies of the vocalizing sounds. The controller determines the frequencies of the sequence of signals for a predetermined interval of time, determines if each measured frequency lies within any of the sub-ranges and if so, then increments a cumulative total of the frequencies which lie in that sub-range to provide a plurality of cumulative totals that represent a frequency spectrum of the barking sounds. The controller then determines whether the barking sounds constitute a valid bark by comparing the frequency spectrum to a predetermined frequency spectrum. Appropriate aversive stimulus signals are produced between the first and second stimulus electrodes if the barking sounds constitute a valid bark.

In a described embodiment, of the electronic apparatus includes a controller (33) and a motion detector (40) connected in substantially fixed relationship to a portion of the dog for producing a motion detection signal in response to a characteristic movement of the portion of dog that accompanies vocalization by the dog. Circuitry in the housing has an input coupled to receive the motion detection signal and is operative to reset the controller from a low-power operating mode into a normal operating mode in response to the motion detection signal to enable the controller to cause the aversive stimulus signal to be produced in response to the vocalizing by the dog.

In a described embodiment, the controller (33) determines if a manual switch (17) is operated to execute a self-test program executing a self-test program, and if so, executes the self-test program prevent the aversive stimulus from being produced between the first and second electrodes, determine if the sensor is producing signals in response to a deliberately produced self-test sound, and eliminate an indicator if the sensor is producing signals in response to the self-test sound to indicate that the sensor is operative.

BRIEF DESCRIPTION OF THE DRAWINGS

FIG. 3B is a side exploded view of the bark limiter unit as shown in FIG. 3A.

FIG. 4A is a perspective view of a LED lens reflector used within the housing of the bark limiter as shown in FIGS. 3A and 3B to provide a practical stimulation intensity indicator.

FIG. 4B is an opposite perspective view of the LED lens reflector shown in FIG. 4A.

DETAILED DESCRIPTION OF THE PREFERRED EMBODIMENTS

A preferred embodiment of a dog bark limiter of the present invention includes an improved vibration transducer structure for transmitting vibrations from the dog's neck through a plastic surface membrane of the bark limiter housing. In the described embodiment, a motion detector detects characteristic motion of the dog's neck produced as a result of barking and in response automatically powers up the circuitry from a very low power stand by operating condition. A technique of "valid" bark detection executes a capture and compare program to accomplish the function of, in effect, generating a frequency spectrum of the received sound and comparing it with a predetermined frequency spectrum to determine if the received sound constitutes a "valid" bark. A self-test mode is provided to self-test or verify operability of the neck motion sensor and the sound vibration sensor.

Figure 1:
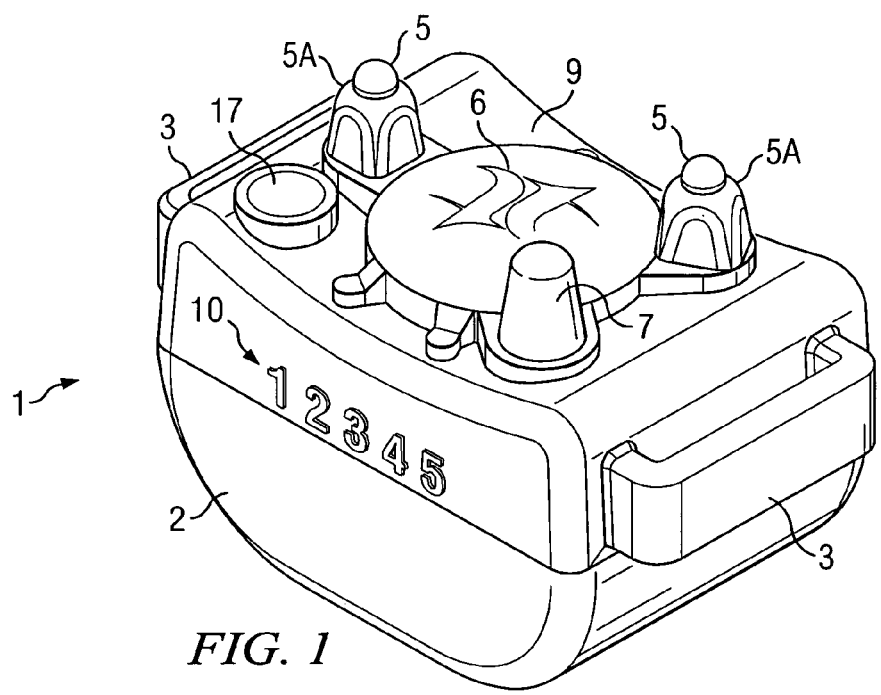
FIG. 1 is a perspective view of a collar-mounted bark limiter unit of the present invention with the collar removed.
Figure 2:
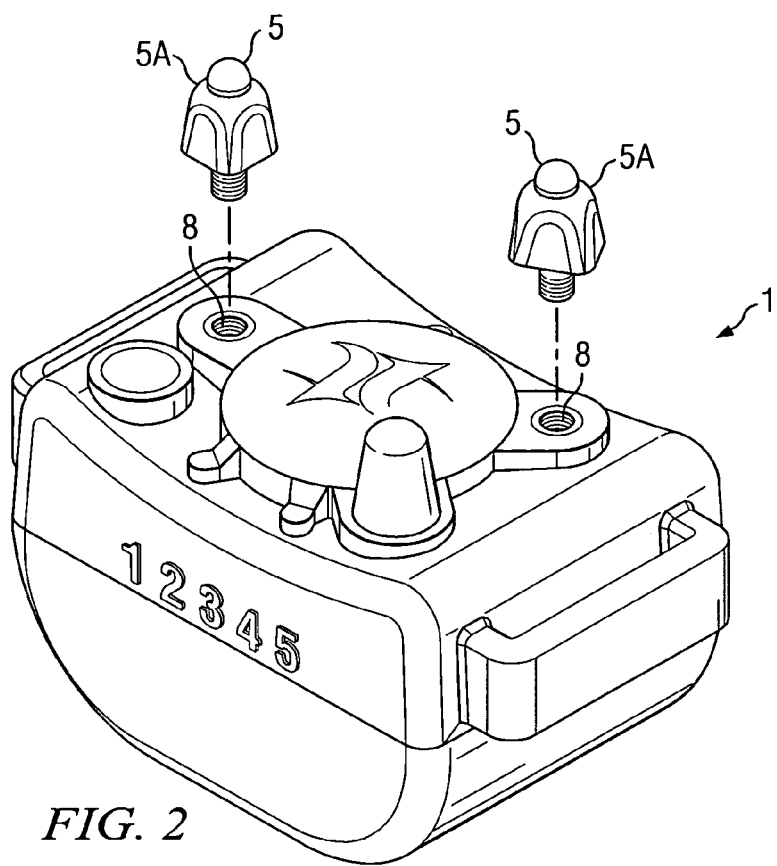
FIG. 2 shows the a partially-exploded view of the bark limiter unit of FIG. 1.

Referring to FIGS. 1, 2, 3A and 3B, bark limiter 1 includes a housing 2 having a lower section 2A and an upper section 2B. The top surface 9 of upper housing section 2B is slightly concave, to better accommodate the curvature of a dog's neck. A pair of collar-retaining loops 3 are attached to opposite ends of upper housing section 2B, as shown. A typical dog collar (not shown) is passed through loops 3 around the bottom surface of housing 2 to fasten bark limiter 1 to the dog's neck. Two stimulus electrodes 5 are threaded into receiving holes 8 (FIG. 2) in the upper surface 9, and their conductive tips are pressed against the dog's neck to make electrical contact therewith when the collar is tightened. As indicated in FIG. 2, stimulus electrodes 5 are removable. A preferably non-conductive stabilizing post of the same height as stimulus electrodes 5 is rigidly attached to upper surface 9, and is offset from a straight line between stimulus electrodes 5 so the stabilizing post 7 to prevent the conductive electrode tips of stimulus electrodes 5 from "rocking" against the dog's neck.

A dome-shaped membrane 6 that preferably is integrally formed with the upper housing section 2B is disposed on upper surface 9 and constitutes part of an improved vibration sensor 30, which is subsequently described in more detail with reference to FIG. 6. Membrane 6 is approximately 0.035 inches in thickness. A membrane switch 17 extends through an opening 4 in upper surface 9. The above features, except the stimulus electrodes 5B and 5C, on the upper surface 9 of upper housing 2B are all integrally formed as a single unit.

Figure 3A:
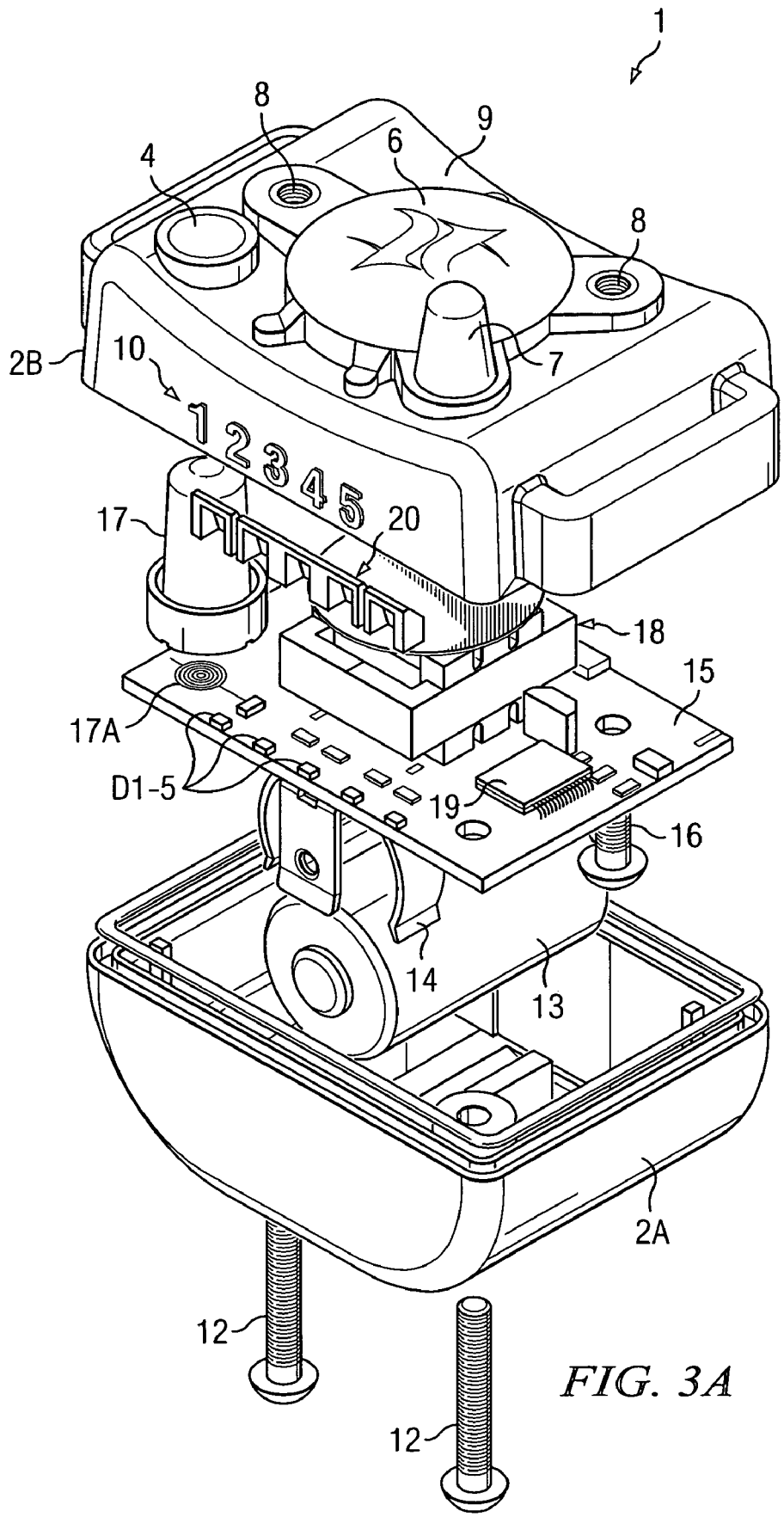
FIG. 3A is a perspective exploded view of the bark limiter unit of FIGS. 1 and 2.

Referring to the exploded views of FIGS. 3A and 3B, lower housing section 2A is attached to upper housing section 2B by means of two screws 12. A printed circuit board 15A contained within housing 2 is attached to upper housing section 2B by means of two screws 16. A 3 volt lithium battery 13 is attached to the bottom of printed circuit board 15A by means of a pair of clips 14. The membrane switch unit 17 is attached to the upper surface of printed circuit board 15A and extends through hole 4 in upper surface 9. A metal trace 17A is contacted to provide a switch closure when the upper surface of membrane switch unit 17 is depressed. An output transformer 18, a microcontroller 19, and five light emitting diodes D1–5 are mounted on the upper surface of printed circuit board 15. As shown in FIG. 3B, a piezoelectric transducer 21 is supported on output transformer 18, and is contacted by a "nipple" 11 (FIG. 5) formed on the underside of dome-shaped membrane 6. Piezoelectric transducer 21 can be a Model P/N: 7BB-20-6 available from Murata Electronics North America, Inc.

The dog owner can repetitively depress membrane switch 17 to select one of five stimulus intensity levels. The intensity indicators 10—1,2,3,4,5 become illuminated by light emitting diodes D1–5, respectively, as membrane switch 17 is successively depressed. The five LEDs correspond to indicators 10—1,2,3,4,5 to indicate which stimulation level has been selected by means of the membrane switch 17, and also indicate whether the bark limiter 1 is in a test mode. Holding switch membrane 17 depressed for 4 seconds sets the bark limiter 1 into its test mode, and the various LEDs D1–5 blink, depending on the neck motion and barking by the dog. The LED corresponding to the intensity level selected by means of membrane switch 17 is the one which blinks.

By way of definition, the term "housing" as used herein is intended to encompass any suitable container structure and/or encapsulation material that is used to contain the components of bark limiter 1. The term "bark limiter" is intended to encompass similar devices that detect sounds from animals other than dogs. The bark limiter could be held by a strap against the chest, rather than the neck of an animal.

Figure 5:
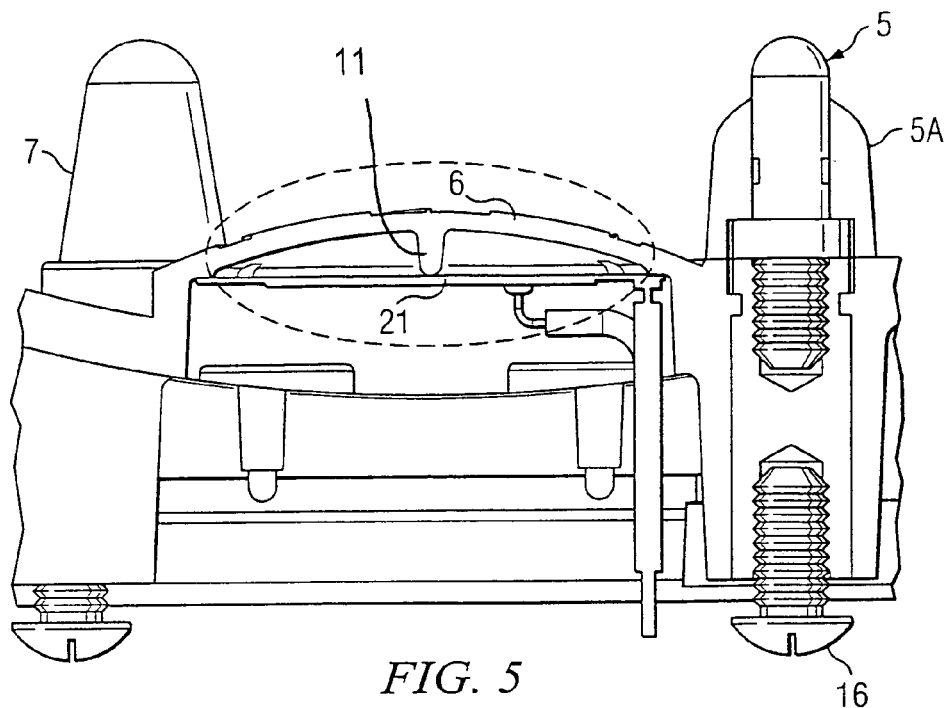
FIG. 5 shows a section on view of a vibration sensor used in the embodiment as shown in FIGS. 1A and 1B.

Referring to FIG. 5, the dome-shaped structure of acoustic membrane 6 is readily apparent, and the location and structure of nipple 11, which preferably is integral with membrane 6, pressing against the central, most sensitive portion of the surface of piezoelectric transducer 21 are shown. In accordance with present invention, this structure has been found to be much more effective in transmitting vibrations from the dog's throat to piezoelectric transducer 21 than prior sound transducers, especially prior piezoelectric transducers encapsulated in RTV material.

The housing 2 of bark limiter 1 is preferably formed of XYLEX plastic material available from General Electric Corp., although other plastic materials also could be utilized. In one implementation, membrane 6 is approximately 30 to 40 mils thick, and nipple 11 is approximately 66 to 76 mils long. The material of which membrane 6 is composed could include material other than that of the housing, and could, for example, include encapsulation material that surrounds the sound transducer if it is capable of transmitting sound vibrations from outside of the housing to the sound transducer 21.

Figures 1, 6:
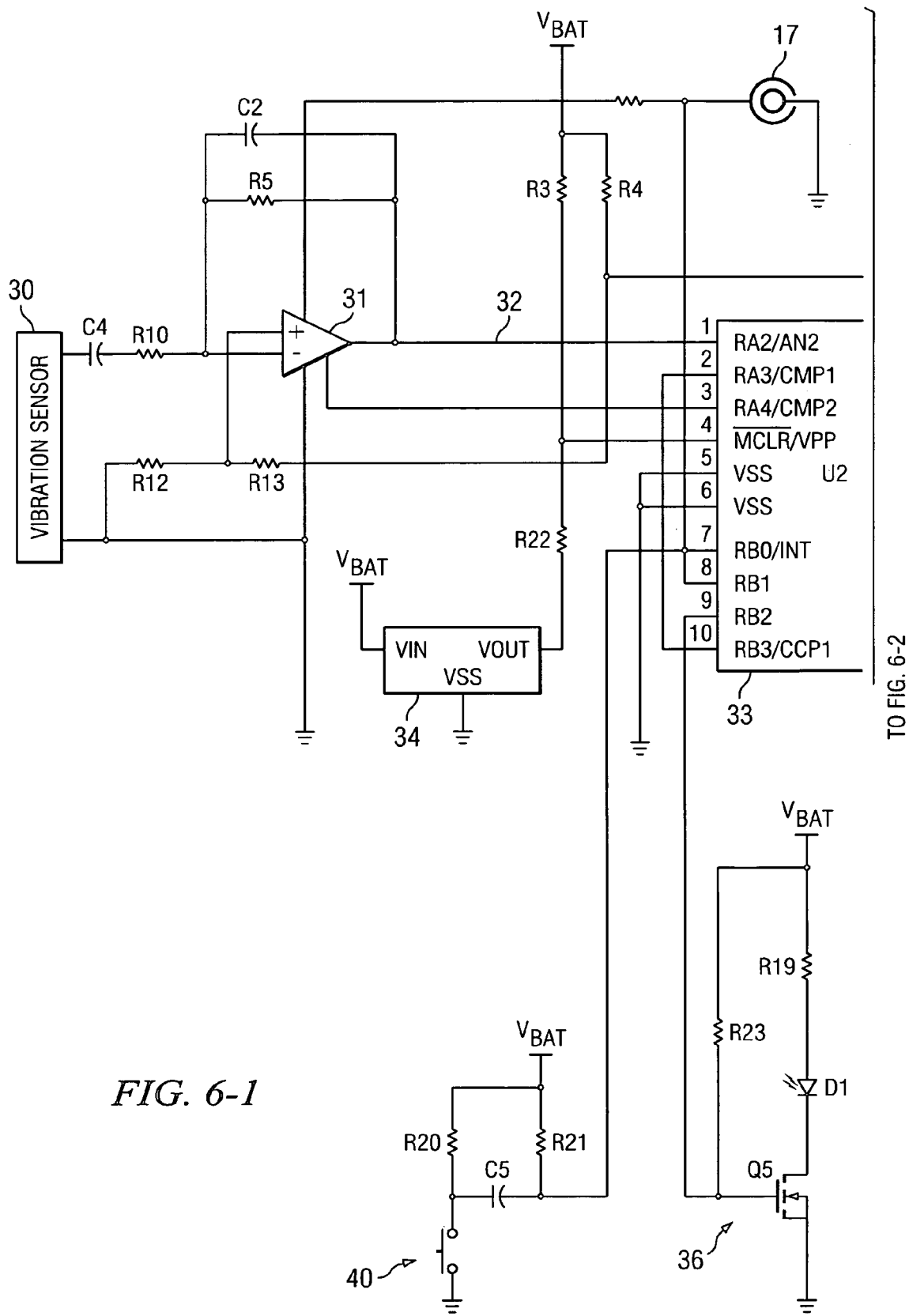
FIG. 6 is a schematic diagram of the circuitry included in the housing of the bark limiter of FIG. 1.
Figures 2, 6:
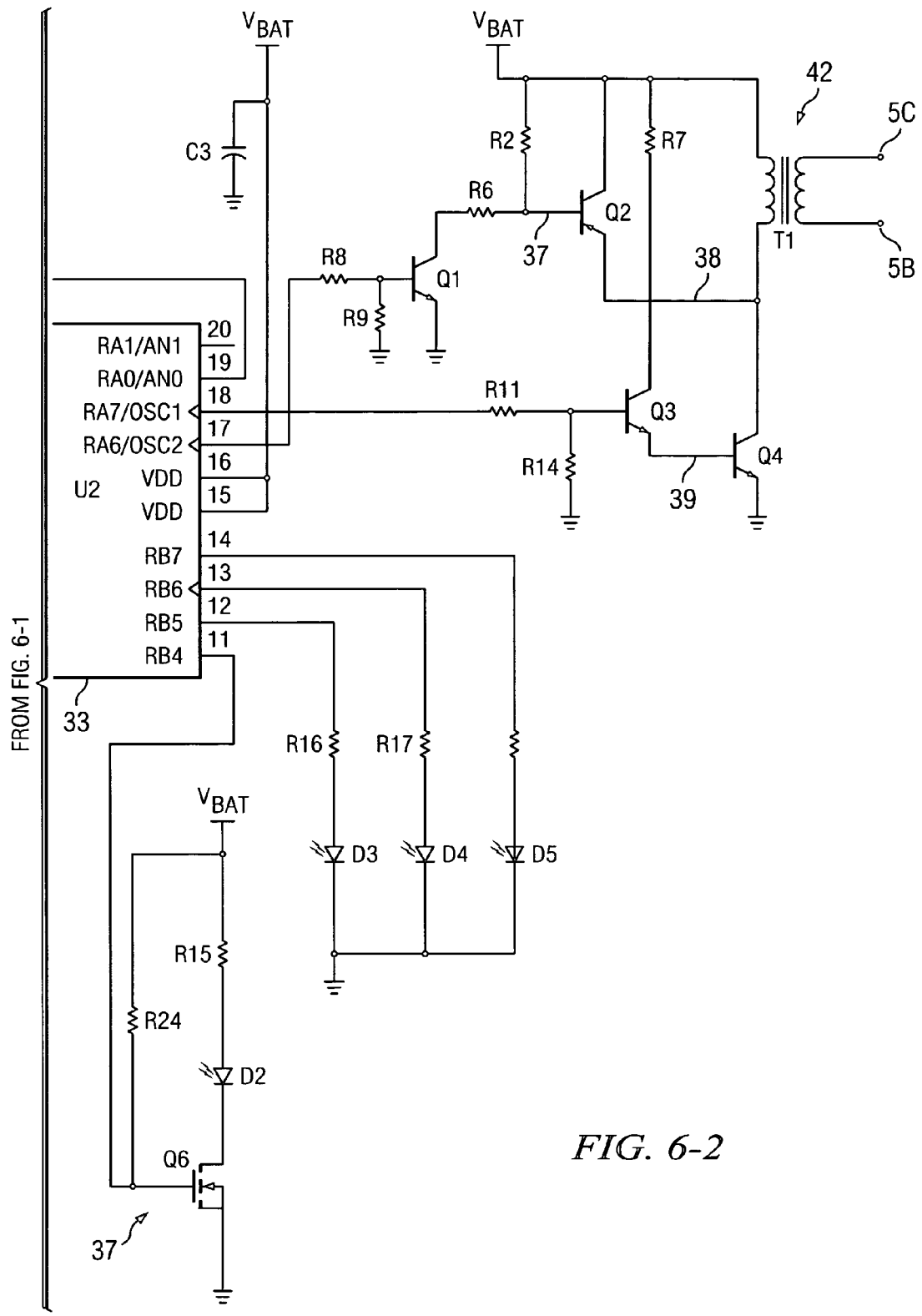

Referring to FIG. 6, the circuitry of bark limiter 1 is provided on the upper surface of printed circuit board 15A (FIG. 3A), and includes vibration sensor assembly 30 which includes above mentioned dome-shaped membrane 6, piezoelectric transducer 21, and the above-mentioned nipple 11 formed on the underside of membrane 6 in order to efficiently transmit vibrations from membrane 6 to piezoelectric transducer 21. One of the electrodes of piezoelectric transducer 21 is connected to ground and the other is coupled by capacitor C4 and resistor R10 to the (−) input of an operational amplifier 31. The (+) input of operational amplifier 31 is connected to the junction between resistor R12 and resistor R13. The other terminal of resistor R12 is connected to ground, and the other terminal of resistor R13 is connected to one terminal of resistor R4 and to the RA0 input on lead 19 of microcontroller 33. The other terminal of resistor R4 is connected to the battery voltage VBAT.

The output of operational amplifier 31 is connected by conductor 32 to the RA2 input on lead 1 of microcontroller 33 and also is connected to one terminal of capacitor C2 and one terminal of resistor R5. The other terminals of resistors R5 and capacitor C2 are connected to the (−) input of operational amplifier 31. The RA2 input of microcontroller 33 is connected to one input of an internal comparator, the other input of which is connected to the RA0 terminal of microcontroller 33, in order to produce an internal square waveform to be used as an input to the internal microprocessor portion of microcontroller 33, to allow the frequency of the square waveform to be determined. The capacitor C2 functions as a low pass filter that sets the upper cutoff frequency of operational amplifier 31. The resistors R5 and R10 to determine the gain of operational amplifier 31.

Voltage monitor circuit 34 in FIG. 6 produces a low output voltage if VBAT is less than approximately 2 volts, and the junction between resistors R3 and R22, which are coupled in series between VBAT and the output of voltage detector 34, applies a reset signal to the microcontroller reset input MCLR on lead 4 thereof if VBAT is below approximately 2 volts. A resistor R4, in combination with resistors R13 and R12, forms a threshold circuit that establishes a threshold voltage to be applied to the internal comparator of microcontroller 33 via its RA0 input. The output of the internal comparator of microcontroller 33 is produced on lead 2 of microcontroller 33, which is externally connected to the CCP1 input on lead 2 of microcontroller 33. The CCP1 input of microcontroller 33 is used in the subsequently described compare-capture mode of operation, to measure the periods of the square waveforms on the CCP1 input. This allows the signals produced by vibration transducer 30 and amplified by operational amplifier 31 to be captured within a 120 millisecond interval and, in effect, assembled into a frequency spectrum including sixteen 40 Hz windows in the range from 150 Hz to 800 Hz, which can be used to determine if the present sound is a valid bark.

Actuation of the motion sensor 40 in FIG. 6 results in a signal applied to lead 7 of microcontroller 33 to indicate whether the dog's present neck motion is of the kind characteristically caused by barking. Microprocessor 33 automatically switches from low-power standby operation at 37 kHz to normal operation at 4 MHz if this signal indicates that the dog has begun barking.

The RB2, 4, 5, 6, and 7 outputs of microcontroller 33 selectively turn on LEDs D1–5, respectively, in response to the pressing of membrane switch 17. However, if microcontroller 33 is reset as a result of VBAT being less than 2.2 volts, microcontroller 33 produces high impedance outputs, and in that case resistors R23 and R24 pull the gate voltages of MOSFETs Q5 and Q6 to VBAT thereby turning them on and allowing the battery to discharge completely through light emitting diodes D4 and D5, turning them both on until the battery is completely dead. If LEDs D4 and D5 emit light simultaneously, that indicates that the battery is discharged and needs to be replaced.

The RA6 output on lead 17 of microcontroller 33 is coupled to the base of an NPN transistor Q1 having its emitter connected to ground and its collector coupled by a resistor R6 to the base of a PNP transistor Q2 having its collector connected to VBAT and its emitter connected by conductor 38 to one terminal of the primary winding of output transformer 42. The base of transistor Q2 also is coupled by a resistor R2 to VBAT. The RA7 output on lead 18 of microcontroller 33 is coupled to the base of an NPN transistor Q3 which has its collector coupled by resistor R7 to VBAT and its emitter connected to the base of an NPN transistor Q4. The emitter of transistor Q4 is connected to ground and its collector is connected to conductor 38. The other terminal of the primary winding of output transformer 42 is connected to VBAT. The secondary winding terminals 5B and 5C are connected to the two stimulus electrodes 5.

Transistor Q4, when turned on, produces a constant collector current for the entire amount of time that transistor Q4 is turned on. If all of the collector current of transistor Q4 flows through the primary winding of transformer 42, that results in delivery of a maximum amount of energy to the primary winding of transformer 42 and therefore results in a maximum amount output energy delivered to the stimulus electrodes 5 by the secondary winding of transformer 42. However, if transistor Q2 is turned on after the peak of the flyback spike that occurs in the waveform of the voltage V38 on conductor 38 immediately after transistor Q4 is turned off, then some of the decaying current in the primary winding of transformer 42 is shunted, causing V38 to rapidly fall to zero. This reduces the amount of energy delivered to the primary winding of transformer 42 for each pulse of the waveform V39 applied to the base of transistor Q4 by microcontroller 33, and therefore also reduces the amount of stimulus energy delivered through stimulus electrodes 5 to the dog's neck.

Microcontroller 33 operates to produce a burst of pulses which are applied to the base of transistor Q4 via the Darlington circuit configuration including transistor.

Figure 8B:
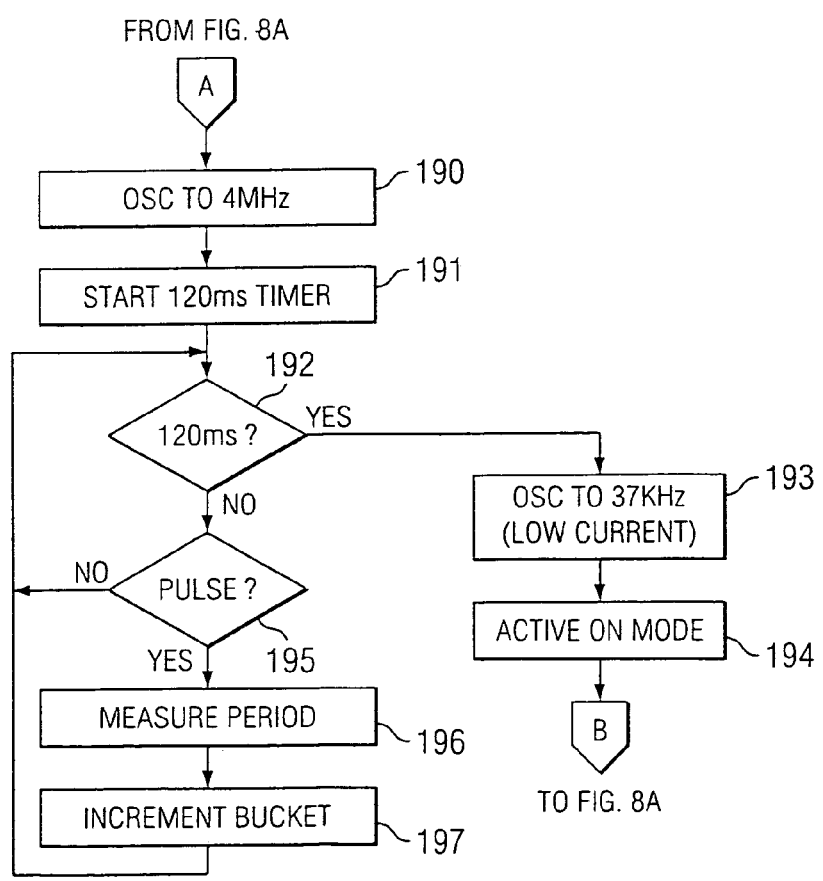
FIGS. 8A and 8B constitute a flowchart of 2 programs executed by the microcontroller 33 included in FIG. 6.
Figures 1, 7:
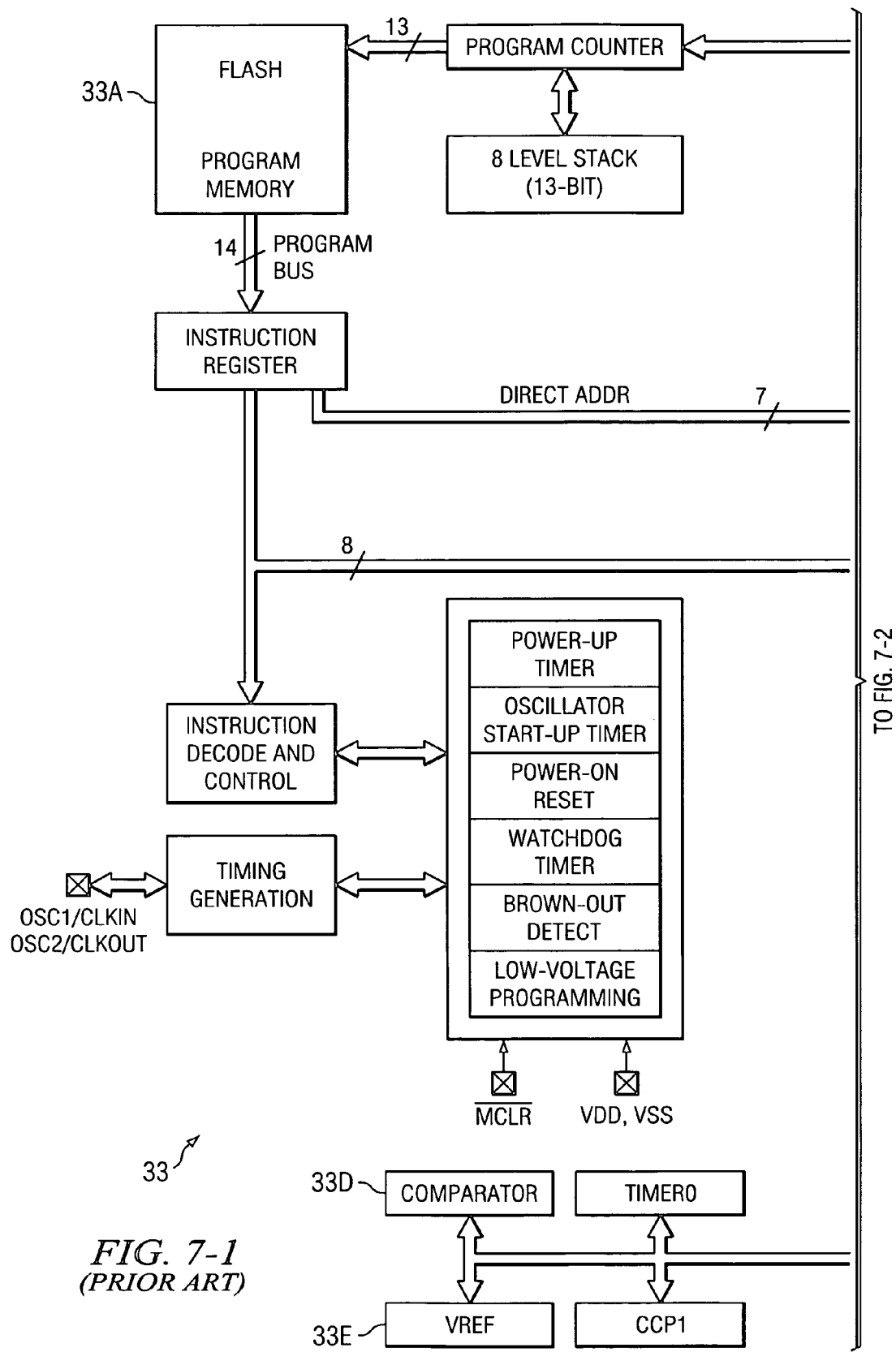
FIG. 7 is a block diagram of the microcontroller 33 shown in FIG. 6.
Figures 2, 7:
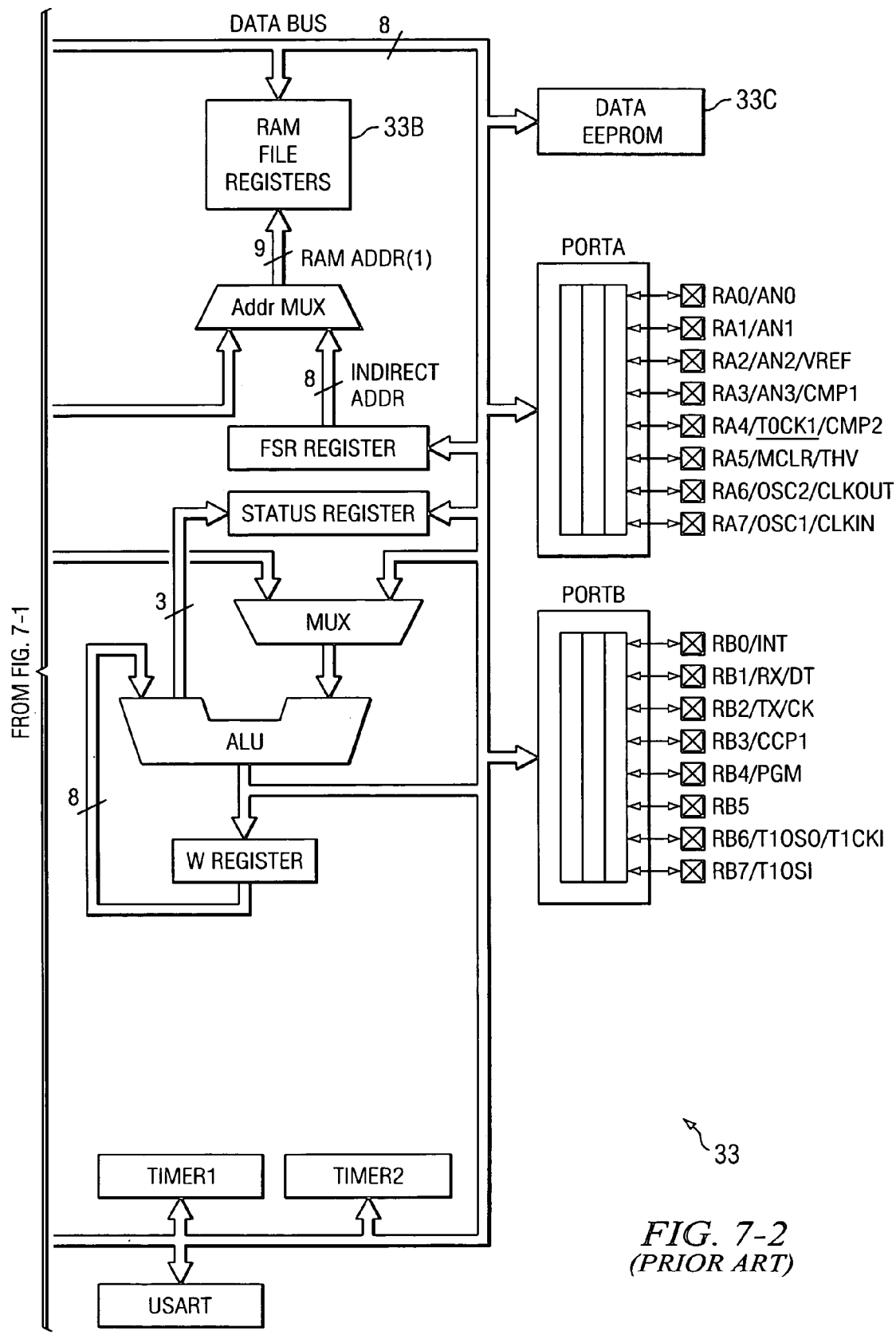
Figure 8A:
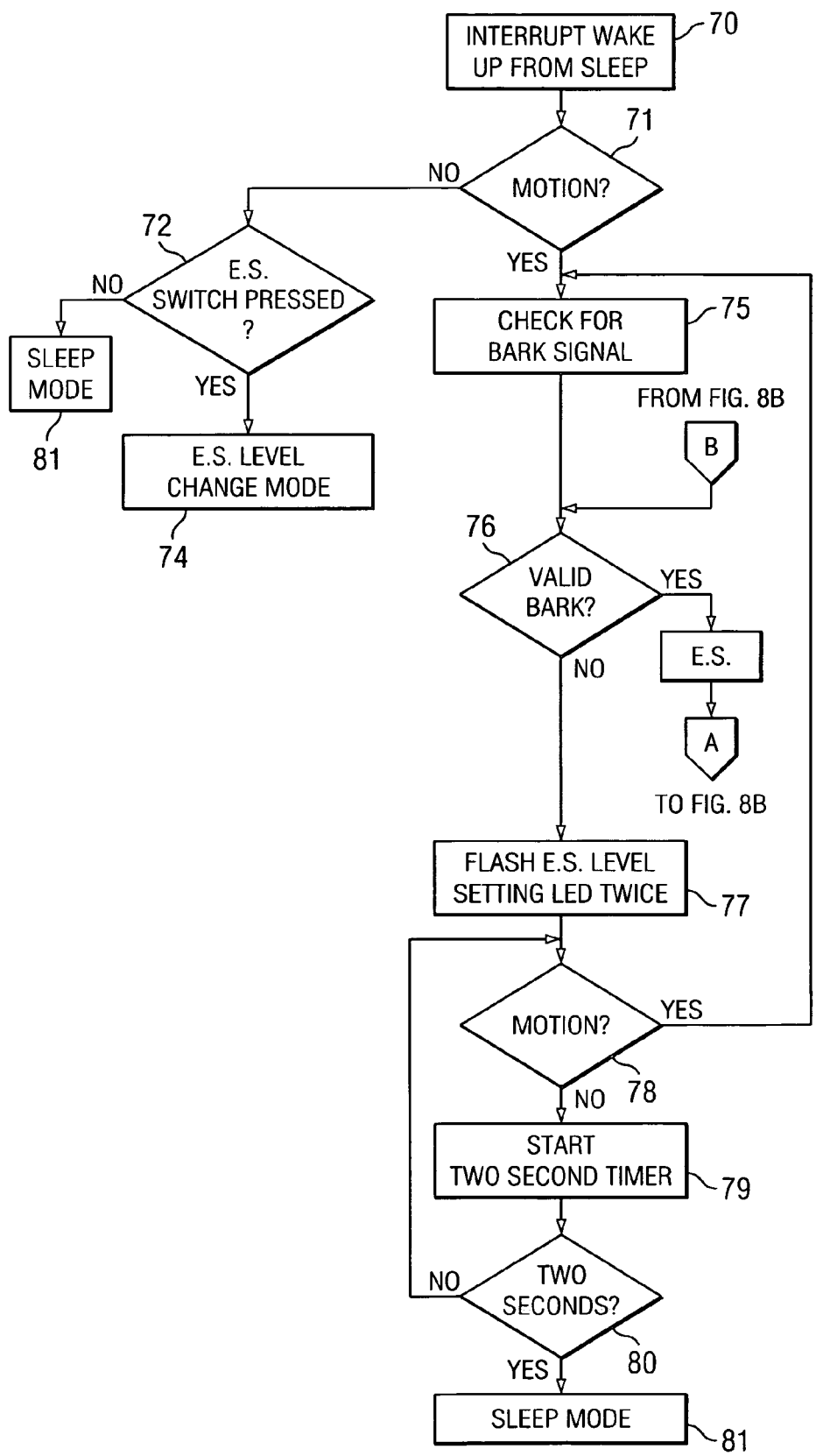

The microcontroller 33 used in the improved bark limiter 1 of the present invention preferably is a PIC16F628 available from Microchip Technology Incorporated, which includes several signal conditioning operational amplifiers, and operates so as to perform the same functions of executing the program represented by the flowchart of FIGS. 8A and 8B. The details of microcontroller 33 are shown in FIG. 7. As shown in FIG. 7, microcontroller includes a flash memory 33A, a random access memory 33B for storing file registers, and a non-volatile EEPROM 33C for storing the operating program and valid bark detection algorithms. Microcontroller 33 also includes the above-mentioned comparator 33D which generates the signal Data In, and also includes a Vref circuit 33E that produces 1 of 16 voltage levels provided as inputs to the comparator input if the comparator input is configured so that a Vref input is needed.

By way of definition, the terms "controller" and "microcontroller" are used herein is intended to encompass any microcontroller, digital signal processor (DSP), logic circuitry, state machine, and/or programmed logic array (PLA) that performs functions of microcontroller 33 as described above.

Motion sensor 40 can be a Model #SQ-SEN-001P Ultra Compact Tilt and Vibration Sensor, available from SignalQuest Inc. Motion sensor 40 is of a mechanical ball-in-tube construction, and includes a conductive ball that makes contact with appropriate electrodes in response to motion of the dog's neck in order to send the "wake-up" signal microcontroller 33. The assignee has discovered that dogs move their heads in a characteristic manner when they bark, and that using motion detector 40 improves accuracy in bark detection of "valid" barking. Specifically, the assignee has discovered that when dogs bark, they tend to move their heads and upper torso in a specific motion pattern that can be detected by the above described motion detector 40, although in some instances other types of motion detectors might be used. Motion patterns that are characteristic of barking can be detected using motion detector 40 and, in accordance with the present invention, a captured digitized bark signal can be utilized to provide a frequency spectrum that represents a "valid" bark in order to provide more accurate bark detection that has previously been achieved.

In accordance with one embodiment of the present invention, the vibration detection operation and motion detection operation are combined to determine whether an aversive stimulus signal should be produced between electrodes 5B and 5C. The motion detection is used primarily as part of detection of a correct or valid bark, and is used secondarily to accomplish awakening bark limiter 1 from its sleep mode. Either the subsequently described "valid bark" detection based on the frequency spectrum of signals received from vibration sensor 30 or motion signals based on movement of motion detector 40 could be considered the primary detection function and the other could be considered to be the secondary detection function. The bark limiter could be awakened or powered up in response to a signal from vibration sensor 30, and the aversive stimulus could then be triggered by detection of neck motion, or vice versa.

Bark limiter 1 has an external power switch function which is performed by membrane switch 17, and also can be automatically turned on or "awakened" by motion sensor 40 in response to the dog making the kind of characteristic head movement that corresponds to barking by the dog. Motion sensor 40 "wakes up" the bark limiter 1 from a low power stand by condition and stimulates microcontroller 33 to begin looking for a barking signal/sound. In the low power condition, microcontroller 33 runs at 37 kHz. Once it is awakened, microcontroller 33 runs at 37 kHz, and if any barking signals are detected, microcontroller 33 operates at 4 MHz to process that information, and then returns to a 37 kHz speed.

The ON mode includes both the SLEEP mode and the ES LEVEL CHANGE mode. The OFF mode allows the bark limiter 1 to be awakened as a result of a switch trigger signal produced by depressing switch 17, and if that occurs, the program executed by microprocessor 33 checks to determine if switch 17 is depressed for least 0.1 seconds, and if it is not, automatically goes back into the SLEEP mode. If bark limiter 1 is in both the ON mode and the SLEEP mode thereof, and a signal is received from motion sensor 40, it immediately checks for a bark signal from vibration sensor 30 while microprocessor 33 is internally operating at 4 MHz, and if there is no bark signal from vibration sensor 30, and the internal clock signal is reduced to 37 kHz, waits for a period of 2 seconds, and then reenters the SLEEP mode. Thus, a user can determine if bark limiter 1 is in its ON mode by subjecting bark limiter 1 to sufficient motion to cause motion sensor 40 to produce a motion signal and noticing if the light emitting diodes blink several times.

The two field effect transistors Q5 and Q6 connected in series with LEDs D4 and D5, respectively, are used to indicate that the battery voltage is too low when the voltage monitor circuit produces a voltage below 2.2 volts.

The assignee has discovered that the nipple 11 which is integral with the under side of dome-shaped membrane 6 conducts vibration energy imparted by the dog to the membrane from the membrane to the vibration transducer more effectively than other sound transducer devices that have been utilized.

One embodiment of the present invention provides an improved technique of bark detection with software by using the internal "Capture/Compare module" of the PIC16LF627 microcontroller 33 to determine "valid" barks. During a 120 ms (or similar) capture time interval, the periods of the various bark signal frequencies are measured and counted. A window of acceptable frequencies in the range of, for example, 150 Hz–800 Hz, is created by the software. This interval or "window" is divided into 16 "buckets" into which the counts of 16 evenly divided frequency ranges are stored. When a bark/sound signal is received, the periods of the bark frequencies are measured during the 120 ms capture interval. The period of the frequency component of the received bark/sound signal is measured, and if the measured period falls within one of the 16 buckets, i.e. frequency ranges, then a software counter assigned to that bucket is incremented. For each complete bark signal/sound captured, the counter totals are compared to predetermined threshold levels for each corresponding bucket, respectively in order to determine whether the bark/sound constitutes a "valid" bark.

The present invention also provides a lightweight bark limiter 1 in a small package which is usable on small dogs yet is capable of providing much higher stimulus levels than the small, lightweight bark limiting devices of the prior art. The more sensitive vibration-sensing structure includes an internal nipple on the under side of the dome-shaped membrane to more effectively transmit vibrational energy from the throat of the dog to the piezoelectric transducer. The vibration sensor may also be usable in anti-cribbing devices for horses.

A 30 second interval is established when the desired electrical stimulus level is changed or if the bark limiter 1 is turned on. During the 30 second interval, the only thing that can happen is for the user to select the desired stimulus level or to turn bark limiter 1 off. During that 30 second interval the lights blink every second. If the user selects a particular stimulus level, it the 30 second timer is reset.

FIG. 8A shows how bark limiter 1 is awakened from its "SLEEP" mode in response to a motion-indicating interrupt signal from motion detector 40, as indicated in decision block 71. If a motion signal is received by microcontroller 33, the program goes from decision block 71 to block 75 and checks to determine if any sound or vibration signal is being received on conductor 32 in response to vibration sensor 30. In decision block 76, the program executes the subroutine of FIG. 8B to determine if the spectrum of sound signals received from vibration sensor 30 is the spectrum of a "valid bark". If this determination is affirmative, the program executes a routine to cause the circuitry including transistors Q1, Q2 and Q3 and transformer 42 to generate an aversive electrical stimulus signal of a selected intensity between stimulation electrodes 5B and 5C.

Referring again to FIG. 8A, if the decision of block 76 is that no valid bark is occurring, the program goes to block 77 and causes the LED corresponding to the selected stimulation level to flash twice, and then goes to decision block 78 and determines if a signal from motion detector 40 indicates that a significant neck motion is occurring. If this determination is affirmative, the program returns to the entry point of block 75 to determine if a bark signal is being received from vibration sensor 30. If the determination of block 78 is negative, the program goes to blocks 79 and 80 and determines if a 2 second interval elapses without neck motion being detected, and if this happens, the program causes microcontroller 33 to go into its sleep mode, as indicated in block 81.

If the determination of decision block 71 is negative, the program goes to decision block 72 and determines if switch 17 is depressed. If switch 17 is not depressed, the program causes microcontroller 33 to go into its sleep mode. If decision block 72 determines that switch 17 is depressed, the program responds in block 74 by determining and storing the new desired stimulus level established by repetitive depressing of switch 17. Specifically, in block 74 the program determines if switch 17 is depressed for more than 1 second, and if this is the case, increments the stimulation level setting from the present level setting (1–5) to the next level setting and saves the new stimulus level setting.

The routine performed in decision block 76 of FIG. 8A is shown in FIG. 8B. Referring to FIG. 8B, in block 190 the program switches the internal oscillator clock frequency of microcontroller 33 from 37 kHz to 4 MHz and then goes to block 191 and starts a 120 millisecond timer, to create a 120 millisecond window within which the frequency spectrum of a "valid bark", if present, is to be "captured". The program then goes to decision block 192 and tests the output of the 120 millisecond timer, and after the 120 millisecond window elapses, the program goes to block 192A and runs a subroutine to determine if the vocalization detected is a valid bark. This is accomplished by comparing the number of times the frequency of the detected vocalization is captured in each frequency range or "bucket" within the 120 millisecond window with a predetermined number of times for each bucket. The program then goes to block 193 and switches the internal oscillator clock frequency of microcontroller 33 back to 37 kHz to provide low power ON mode operation. The program then returns to the entry point of decision block 76 of FIG. 8A.

If block 192 determines that the 120 milliseconds timer is still counting, the program then goes to decision block 195 and determines if there is a change in the level of the signal on leads 2 and 10 of microcontroller 33 to indicate that a "pulse" is present. If this determination is negative, the program reenters the entry point of decision block 192, but if the presence of the pulse is detected, the program goes to block 196 and measures the duration of the pulse, and in block 197 increments the frequency spectrum "bucket" or counter which corresponds to the period (i.e., frequency) measured in block 196. The program then reenters decision block 192 and continues the process until the 120 millisecond timer elapses. The "pulse" referred to is generated on lead 2 of microcontroller 33 from an internal comparator therein and is provided as an input to lead 10 of microcontroller 33, which is the "capture and compare" (CCP1) input of microcontroller 33, and automatically starts a timer at the beginning of the pulse and stops the timer at the end of the pulse, so the frequency of the signal coming from vibration sensor 30 is thereby determined and can be used to select the appropriate frequency spectrum bucket to be incremented in order to acquire the frequency spectrum of the present bark signals received from vibration sensor 30 by one input of the internal comparator referred to. Lead 2 of microcontroller 33 is the output of that comparator. The reference applied to the other input of the internal comparator is established by the voltage on lead 19 by the resistive voltage divider circuitry shown in FIG. 6.

Whenever bark limiter 1 enters the ON mode, it checks for neck motion, and if neck motion is detected, the program executed by microcontroller 33 checks for a valid bark. If there is neck motion but no valid bark, the program checks for incrementing of the selected stimulus level by means of switch 17. If no incrementing of the stimulus level by means of switch 17 is occurring, the program causes bark limiter 1 to go into the SLEEP mode.

Note that the OFF mode of bark limiter 1 is different than the above-mentioned SLEEP mode. In the OFF mode, the program checks only to determine if membrane switch 17 is being depressed to turn bark limiter 1 on. The OFF mode only serves as a mode that will be mostly the same as the SLEEP mode, in order to conserve battery life and also in order to allow bark limiter 1 to be removed from an animal in such a way that the motion sensor does not initiate an ON mode. The OFF mode also can be used as a safety feature, in the sense that bark limiter 1 can be turned off when the collar strap is being adjusted or when the bark limiter 1 is being put on or removed from the dog so that there will be no possibility of electrical stimulus being accidentally applied to the dog.

If the program goes into its "TEST" mode as a result of bark limiter 1 initially being in its OFF condition and switch 17 then being depressed for more than 100 milliseconds and less than four seconds, that condition is indicated by LEDs 1–5 sequentially turning on and off so as to "sweep" in a sequence that indicates initiation of the self-test mode. The program then starts a 15 second timer, and checks to determine if the 15 second timer has elapsed, in which case bark limiter 1 is put into its ON mode. If the 15 second timer has not elapsed, then the program determines if any signal is being produced by vibration sensor 30. If a signal is being received from vibration sensor 30, the program causes light emitting diode D3 to flash for 100 milliseconds. Therefore, self-testing can be accomplished by scratching membrane 6 (FIG. a1) vibration sensor 30 during the 15 second duration of the test mode in order to cause LED 3 to flash, thereby proving the operability of vibration sensor 30.

Note that it is important that the dog not receive stimulus due to motion alone, because detecting of motion through the motion sensor 40 does not accurately determine the occurrence of valid barking. Also note that it is important that the dog not be accidentally electrically stimulated if it rubs against something or if miscellaneous vibration is picked up by the vibration sensor 30.

The described vibration sensor arrangement avoids the need to use the external microphones and connecting wires of some prior art bark limiter devices. Use of the described vibration sensor in conjunction with the motion detector output signal provides effective discrimination between barking sounds and other sounds and vibrations that the dog might make and avoids undesired aversive stimulation from being applied to the dog in response to such other sounds and vibrations.

While the invention has been described with reference to several particular embodiments thereof, those skilled in the art will be able to make the various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. An electronic apparatus for control of vocalizing by a dog, comprising:
   (a) a housing supported against the animal's skin by a strap;
   (b) first and second stimulus electrodes connected to a surface of the housing;
   (c) a sensor supported by the housing for producing signals in response to vocalizing by the dog, the sensor including
      i. a membrane supported by the surface for transmitting vibration energy from the vocalizing of the dog through the housing,
      ii. a rigid nipple engaging a center point of the membrane,
      iii. a sound transducer engaging the nipple; and
   (d) control circuitry in the housing having an input coupled to an output of the transducer, the control circuitry including output terminals coupled to produce aversive stimulus signals between the first and second electrodes in response to the signals produced in response to vocalizing by the dog.

2. The electronic apparatus of claim 1 wherein the sound transducer is located within the housing.

3. The electronic apparatus of claim 1 wherein the control circuitry includes a controller, the controller executing a stored program for performing the steps of
   (1) selecting a range of frequencies within which valid vocalizing sounds fall and dividing the range into a plurality of sub-ranges and storing the sub-ranges;
   (2) electronically converting vocalizing sounds from the dog into a sequence of corresponding signals representing the frequencies of the vocalizing sounds;
   (3) determining the frequencies of the sequence of signals for a predetermined interval of time;
   (4) determining if each measured frequency lies within any of the sub-ranges and if so, then incrementing a cumulative total of the frequencies which lie in that sub-range to provide a plurality of cumulative totals that represent a frequency spectrum of the barking sounds;
   (5) determining whether the barking sounds constitute a valid bark by comparing the frequency spectrum to a predetermined frequency spectrum; and
   (6) causing appropriate aversive stimulus signals to be produced between the first and second stimulus electrodes if the determination of step (5) determines that the barking sounds constitute a valid bark.

4. The electronic apparatus of claim 1 wherein the control circuitry includes a controller, the electronic apparatus including
   a motion detector connected in substantially fixed relationship to a portion of the dog for producing a motion detection signal in response to a characteristic movement of the portion of dog that accompanies vocalization by the dog; and
   circuitry in the housing having an input coupled to receive the motion detection signal and operative to reset the controller from a low-power operating mode into a normal operating mode in response to the motion detection signal to enable the controller to cause the aversive stimulus signal to be produced in response to the vocalizing by the dog.

5. The electronic apparatus of claim 1 wherein the control circuitry includes a controller, the electronic apparatus including a manual switch, the controller determining if the switch has been operated to execute a self-test program executing a self-test program, and if so, executing the self-test program to:
   prevent the aversive stimulus from being produced between the first and second electrodes;
   determine if the sensor is producing signals in response to a deliberately produced self-test sound; and
   illuminating an indicator if the sensor is producing signals in response to the self-test sound to indicate that the sensor is operative.

6. The electronic apparatus of claim 5 wherein the indicator includes light emitting diode circuit means for illuminating a light emitting diode in response to the controller if the sensor is producing signals in response to the deliberately produced self-test sound.

7. A collar-mounted electronic apparatus for control of barking by a dog, comprising:
   (a) a housing supported by a collar for attachment to the dog's neck;
   (b) first and second stimulus electrodes connected to a surface of the housing;
   (c) a vibration sensor supported by the housing for detecting vibrations caused by barking by the dog, vibration sensor including i. a membrane supported by the surface for transmitting vibration energy from the neck of the dog through the housing, ii. a rigid nipple engaging a central point of the membrane, iii. a sound transducer engaging the nipple; and (d) control circuitry in the housing having an input coupled to an output of the vibration sensor, the control circuitry including output terminals connected to produce aversive stimulus signals between the first and second electrodes in response to barking by the dog.

8. The collar-mounted electronic apparatus of claim 7 wherein the sound transducer includes a piezoelectric transducer.

9. The collar-mounted electronic apparatus of claim 7 wherein the nipple is integral with the membrane.

10. The collar-mounted electronic apparatus of claim 7 wherein the membrane is integral with the surface of the housing.

11. The collar-mounted electronic apparatus of claim 10 wherein the thickness of the membrane is in the range from 0.030 to 0.040 inches.

12. The collar-mounted electronic apparatus of claim 7 wherein the height of the nipple is in the range from 0.066 to 0.076 inches.

13. The electronic apparatus of claim 7 wherein the sound transducer is located within the housing.

14. The collar-mounted electronic apparatus of claim 7 wherein the control circuitry includes a controller, the controller executing a stored program for performing the steps of (1) selecting a range of frequencies within which valid vocalizing sounds fall and dividing the range into a plurality of sub-ranges and storing the sub-ranges;

(2) electronically converting vocalizing sounds from the dog into a sequence of corresponding signals representing the frequencies of the vocalizing sounds;

(3) determining the frequencies of the sequence of signals for a predetermined interval of time;

(4) determining if each measured frequency lies within any of the sub-ranges and if so, then incrementing a cumulative total of the frequencies which lie in that sub-range to provide a plurality of cumulative totals that represent a frequency spectrum of the barking sounds;

(5) determining whether the barking sounds constitute a valid bark by comparing the frequency spectrum to a predetermined frequency spectrum; and (6) causing appropriate aversive stimulus signals to be produced between the first and second stimulus electrodes if the determination of step (5) determines that the barking sounds constitute a valid bark.

15. The electronic apparatus of claim 14 including a motion detector connected in substantially fixed relationship to a portion of the dog for producing a motion detection signal in response to a characteristic movement of the portion of dog that accompanies vocalization by the dog; and circuitry in the housing having an input coupled to receive the motion detection signal and operative to reset the controller from a low-power operating mode into a normal operating mode in response to the motion detection signal to enable the controller to cause the aversive stimulus signal to be produced.

16. The electronic apparatus of claim 14 wherein the range of frequencies is from 150 Hertz to 800 Hertz.

17. The electronic apparatus of claim 16 wherein the number of sub-ranges is 16.

18. The electronic apparatus of claim 16 wherein the sub-ranges are contiguous across the range.

19. The electronic apparatus of claim 16 wherein the predetermined interval of time is approximately 120 milliseconds.

* * * * *